Aug. 18, 1931.   J. HARTNESS   1,819,025
THREAD GAUGE
Original Filed April 7, 1927
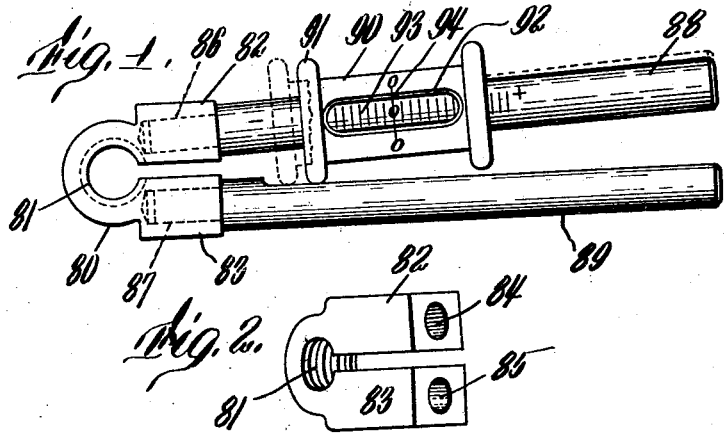
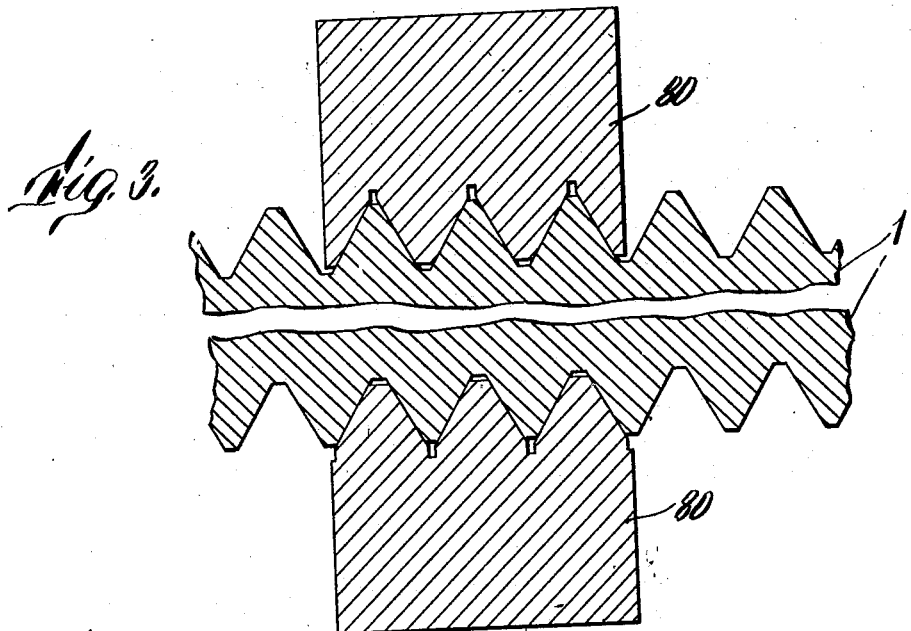
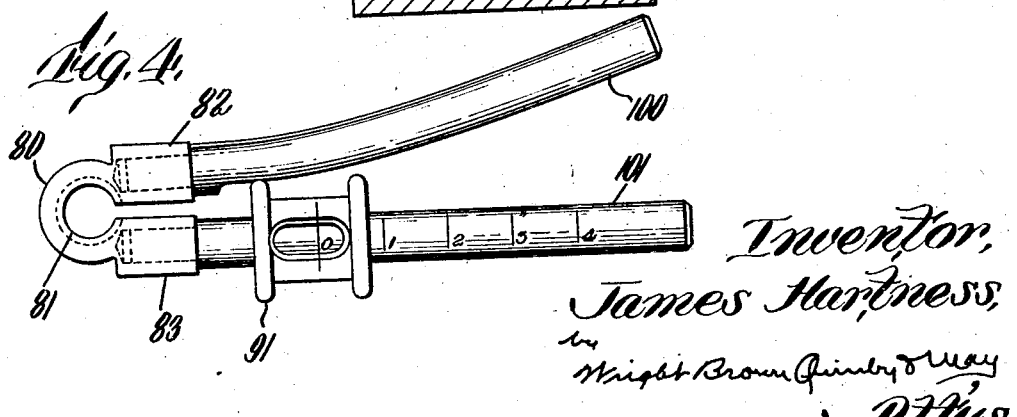
Inventor,
James Hartness,
by Wright Brown Quinby & May
Attys.

Patented Aug. 18, 1931

1,819,025

UNITED STATES PATENT OFFICE

JAMES HARTNESS, OF SPRINGFIELD, VERMONT

THREAD GAUGE

Original application filed April 7, 1927, Serial No. 181,708. Divided and this application filed March 18, 1929. Serial No. 347,844.

This invention relates to gauges for testing externally threaded work to determine the effective gauging diameter of the threads, the present application covering subject matter divided out from my application for patent Serial No. 181,708 filed April 7, 1927, for thread gauges. The gauge of the present invention is of the general type disclosed and specifically claimed in that application in that it employs an element which may be wrapped about the work in engagement between and on the flanks of the threads, the extent of wrapping of a given length of the element acting as a measure of the effective thread diameter, which may be expressed in terms of pitch diameter. The gauge herein disclosed and claimed, however, is specific in that the wrapping element is of a length less than a single thread convolution, the nearness of the approach of these ends to each other when the gauge is closed on the work being a measure of the pitch diameter of the work.

For a more complete understanding of this invention, reference may be had to the accompanying drawings in which Figure 1 is a side elevation of one form of the gauge.

Figure 2 is a detail perspective of the wrapping element.

Figure 3 is a diagrammatic section showing the gauge closed onto the work.

Figure 4 is a side elevation of a modified form of gauge.

Referring to these figures, 80 indicates a spring jaw internally threaded as at 81 which may be closed down upon an externally threaded member. In its normal condition the end portions 82 and 83 of this spring jaw may be sprung somewhat apart and the threaded opening 81 then being sufficiently above basic to permit the insertion therein of any screw having a pitch diameter within the tolerance limits for the particular size screw intended to be tested by this gauge or the jaw may be normally closed so that the portions 82 and 83 must be sprung open to permit the work to be inserted. The end portions 82 and 83 have sockets 84 and 85 in which are fixed the reduced extremities 86 and 87 of a pair of rods or handles 88 and 89. One of these rods, as 88, has slidably mounted thereon a spool shaped indicator 90 which as shown has a flange 91 which may bear against the adjacent face of the rod 89. This indicator 90 is shown as provided with a slot 92 at its central portion through which is visible a scale 93 marked on the rod 88, the marginal portion of the slot 92 being provided with an indicating mark 94. The handle portions 88 and 89 being in separated condition but extending in the same general direction and the member 90 slid toward the outer end, the threaded member 1 is screwed into the opening 81, and when in position therein the rods 88 and 89 are brought or allowed to spring toward each other, depending on whether the spring jaw is normally open or closed, as far as permitted by engagement of the member 81 on the threaded member continuously therearound. The spool shaped member 90 is then moved away from the free end of the rod 88 as far as is permitted by the engagement of the flange on the rod 89, whereupon the index mark 94 indicates a point on the graduations 93. By comparing the position of this point when a standard threaded member is within the opening 81 and when a threaded member to be tested is within this opening, the pitch diameter of the member to be tested may be compared with that of the standard. Preferably the scale 93 is marked with a zero point where the mark 94 registers when a standard test piece is within the opening 81, the gauge being closed thereon.

In Figure 4 a modification of this construction is shown in order that the scale over which the spool shaped indicator passes may be uniformly divided, equal increments corresponding to equal increments of pitch diameter. For this purpose the arm or handle 100 against which the indicator flange 91 bears is curved as shown in Figure 4, this curve being so laid out that equal distances along the scale on the straight arm or handle 101, when the arm 100 engages the spool shaped member, represent equal changes of pitch diameter of work within the opening 81.

Having thus described certain embodi- ments of this invention it should be evident that various changes and modifications might be made therein without departing from its spirit or scope as defined by the appended claims.

I claim:

1. A thread gauge comprising a spring loop constructed to be sprung about and engaged between adjacent threads of a threaded member to engage said threaded member continuously therearound, said loop terminating in rigid handle portions extending in the same general direction, and an indicating element slidable on one of said handle portions and limited in its approach to said loop by the other of said handle portions for indicating the extent of closing of said loop permitted on closing said loop about the threaded member to be tested.

2. A thread gauge comprising a spring loop constructed to be sprung about and engaged between adjacent threads of a threaded member to engage said threaded member continuously therearound, said loop terminating in rigid handle portions extending in the same general direction, and an indicatng element slidable on one of said handle portions and limited in its approach to said loop by the other of said handle portions for indicating the extent of closing of said loop permitted on closing said loop about the threaded member to be tested, said other handle portion being so shaped as to cause equal closing increments to correspond with equal limiting spacings of said indicating element along said one handle portion.

3. A thread gauge comprising a spring loop having an internal thread engageable between adjacent external threads of a threaded member to be tested inserted within said loop when said loop is sprung closed thereon to engage continuously therearound, rigid handles extending from the ends of said loop in the same general direction, and an indicator slidable on one of said handles and limited in its approach to said loop by the other of said handles, said one handle and indicator having cooperating marks to indicate the nearness to standard of the pitch diameter of said member when said loop is closed thereon and said indicator is moved theretoward as far as permitted by said other handle.

In testimony whereof I have affixed my signature.

JAMES HARTNESS.